United States Patent [19]

Kuhn

[11] Patent Number: 5,941,220

[45] Date of Patent: Aug. 24, 1999

[54] MOTOR VEHICLE WITH AN INTERNAL COMBUSTION ENGINE WITH AN EXTERNAL EXHAUST GAS RECIRCULATION SYSTEM AND HEATER

[75] Inventor: Wilhelm Kuhn, Königslutter, Germany

[73] Assignee: Volkswagen AG, Wolfsburg, Germany

[21] Appl. No.: 09/190,844

[22] Filed: Nov. 12, 1998

Related U.S. Application Data

[63] Continuation of application No. PCT/EP97/02901, Jun. 4, 1997.

[51] Int. Cl.$^6$ .............................. F02M 25/07; B60H 1/08
[52] U.S. Cl. .................................. 123/568.11; 237/12.3 B
[58] Field of Search ................. 123/568.12; 237/12.3 B; 165/52; 60/605.2

[56] References Cited

U.S. PATENT DOCUMENTS

| | | | |
|---|---|---|---|
| 4,055,158 | 11/1977 | Marsee | 123/568.12 |
| 4,593,749 | 6/1986 | Schatz | 165/1 |
| 5,740,786 | 3/1998 | Gartner | 123/570 |

FOREIGN PATENT DOCUMENTS

| | | |
|---|---|---|
| 2648087 | 6/1989 | France . |
| 2718491 | 4/1994 | France . |
| 3103198 | 1/1981 | Germany . |
| 4422966 | 6/1994 | Germany . |

*Primary Examiner*—Willis R. Wolfe
*Assistant Examiner*—Arnold Castro
*Attorney, Agent, or Firm*—Baker & Botts, L.L.P.

[57] ABSTRACT

A motor vehicle has an internal combustion engine with an external exhaust gas recirculation system in the form of an exhaust gas return duct connecting an exhaust duct to an intake duct and the vehicle passenger compartment has a heater with a heat exchanger receiving a fluid heat transfer medium. At least part of the structure of the exhaust return duct has two walls, and heat transfer medium flows through the space formed between the walls, providing an exhaust return heat exchanger which transfers the heat removed from the returned exhaust gas to the heat transfer medium which provides the heater with additional heating power so that additional heater frequently required for heaters used with engines having a high degree of efficiency is not required for operation of the motor vehicle when outdoor temperatures are low. Also, nitrogen oxide emissions are reduced by lowering the maximum combustion temperature, and fuel consumption is reduced.

11 Claims, 2 Drawing Sheets

MOTOR VEHICLE WITH AN INTERNAL COMBUSTION ENGINE WITH AN EXTERNAL EXHAUST GAS RECIRCULATION SYSTEM AND HEATER

REFERENCE TO RELATED APPLICATION

This application is a continuation of International Application No. PCTEP9702901 filed Jun. 4, 1997.

BACKGROUND OF THE INVENTION

This invention relates to motor vehicles having an internal combustion engine with an external exhaust gas recirculation system in the form of an exhaust return line connecting an exhaust line to an intake duct and having a passenger compartment with a heater with a heating circuit containing a heat transport fluid.

Motor vehicles are commonly powered by internal combustion engines. Conventional internal combustion engines are piston engines having an intermittent mode of fuel combustion which results in non-optimal combustion processes. Consequently, in addition to harmless combustion products such as water and carbon dioxide, substantial amounts of atmosphere pollutants are formed. Among the most significant pollutants generated by internal combustion engines in the exhaust gas are oxides of nitrogen ($NO_x$). The formation of nitrogen oxides is critically dependent on the peak combustion temperature. To reduce the peak combustion temperature, some internal combustion engines have been equipped with exhaust gas recirculation arrangements. In external exhaust gas recirculation, an exhaust gas return line connects the exhaust duct of the engine to the intake duct. A portion of the exhaust gases displaced from the combustion chamber during the exhaust stroke of the piston is recirculated through the exhaust return line to be supplied to the combustion chamber during the next intake stroke together with a fuel-air mixture, in the case of an Otto engine, or combustion air in the case of a Diesel engine.

The proportion of recirculated exhaust gas in the cylinder charge cannot be increased above a certain level because, if the fuel mixture is too lean, emissions of hydrocarbons will increase.

Another way to reduce pollutant emissions in internal combustion engines is to reduce the specific fuel consumption. Modern Diesel engines with direct injection may obtain such high efficiencies in this way that vehicle engines of average size often fail to supply enough heat to the engine coolant during operation in the partial load range to heat the passenger compartment of the vehicle sufficiently at low ambient temperatures.

Consequently, supplementary electric heating systems producing a heat output between about 500 W and 1 kW have been proposed for heating the engine coolant under unfavorable operating conditions, i.e., to permit heating of the passenger compartment when the engine is running at partial load and outside temperatures are low. The cost involved in providing such supplementary electric heating systems includes, in particular, larger electric generators. In addition to the increased manufacturing cost, the vehicle weight is undesirably increased, contradicting the primary objective of achieving lower fuel consumption.

Special heat exchangers located in an exhaust line have also been proposed, for example in German Patent No. 31 03 198, to provide additional coolant heating capability. Such heat exchangers do withdraw heat from the exhaust, but are installed at a location in the coolant line at which there is no positive effect on the combustion temperature and, therefore, they cannot produce any reduction of nitrogen oxide emissions.

SUMMARY OF THE INVENTION

Accordingly, it is an object of the present invention to provide a motor vehicle having an internal combustion engine with an external exhaust gas recirculation system and a heater which overcomes disadvantages of the prior art.

Another object of the invention is to provide a motor vehicle with an internal combustion engine having improved pollutant control, and also, in the case of a high-efficiency engine, to reduce or eliminate the need for supplementary heating.

These and other objects of the invention are attained by providing a motor vehicle having an internal combustion engine with external exhaust recirculation and a heater for the passenger compartment with a heat exchanger capable of supplying heat to the heater from the exhaust returned through the exhaust recirculation line, the heat being reintroducible into the heating circuit between the engine and the heating device.

By providing a heat exchanger in the exhaust return line according to the invention not only are the returned exhaust gases cooled so that the peak combustion temperature and hence the emissions of nitrogen oxides can be reduced without incurring the negative consequences of too high a proportion of returned exhaust but, in addition, supplementary heating power can be provided in a simple manner in the range from 500 W to 1 kW for internal combustion engines having the output power commonly used in motor vehicles.

The twofold benefit thus achieved is available with a simple addition to the motor vehicle so that the manufacturing cost of a motor vehicle arranged according to the invention may be reduced compared to an otherwise comparable motor vehicle equipped with an electrical or other supplementary heating arrangement.

In a preferred embodiment of the invention, an internal combustion engine having a coolant circuit has an exhaust return line heat exchanger which is integrated in the coolant circuit so that the heat taken from the returned exhaust passing through the heat exchanger will heat the engine coolant even if the vehicle heater is turned off so as to effect cooling of the returned exhaust when the heating system is not in use. If the heat exchanger for the vehicle heating is constantly traversed by coolant, the exhaust return line heat exchanger may instead be connected directly into the vehicle heating circuit.

In accordance with another aspect of the invention, a valve is included in the exhaust return line in a conventional manner so that, as another advantage of the invention, the radiator required for the engine coolant circuit in the case of a water-cooled engine need not be any larger than in a conventional engine because the exhaust gas return line for exhaust recirculation can be closed by the valve when the engine is running under full load.

BRIEF DESCRIPTION OF THE DRAWINGS

Further objects and advantages of the invention will be apparent from a reading of the following description in conjunction with the accompanying drawings, in which.

DESCRIPTION OF THE PREFERRED EMBODIMENTS

Figure 1:
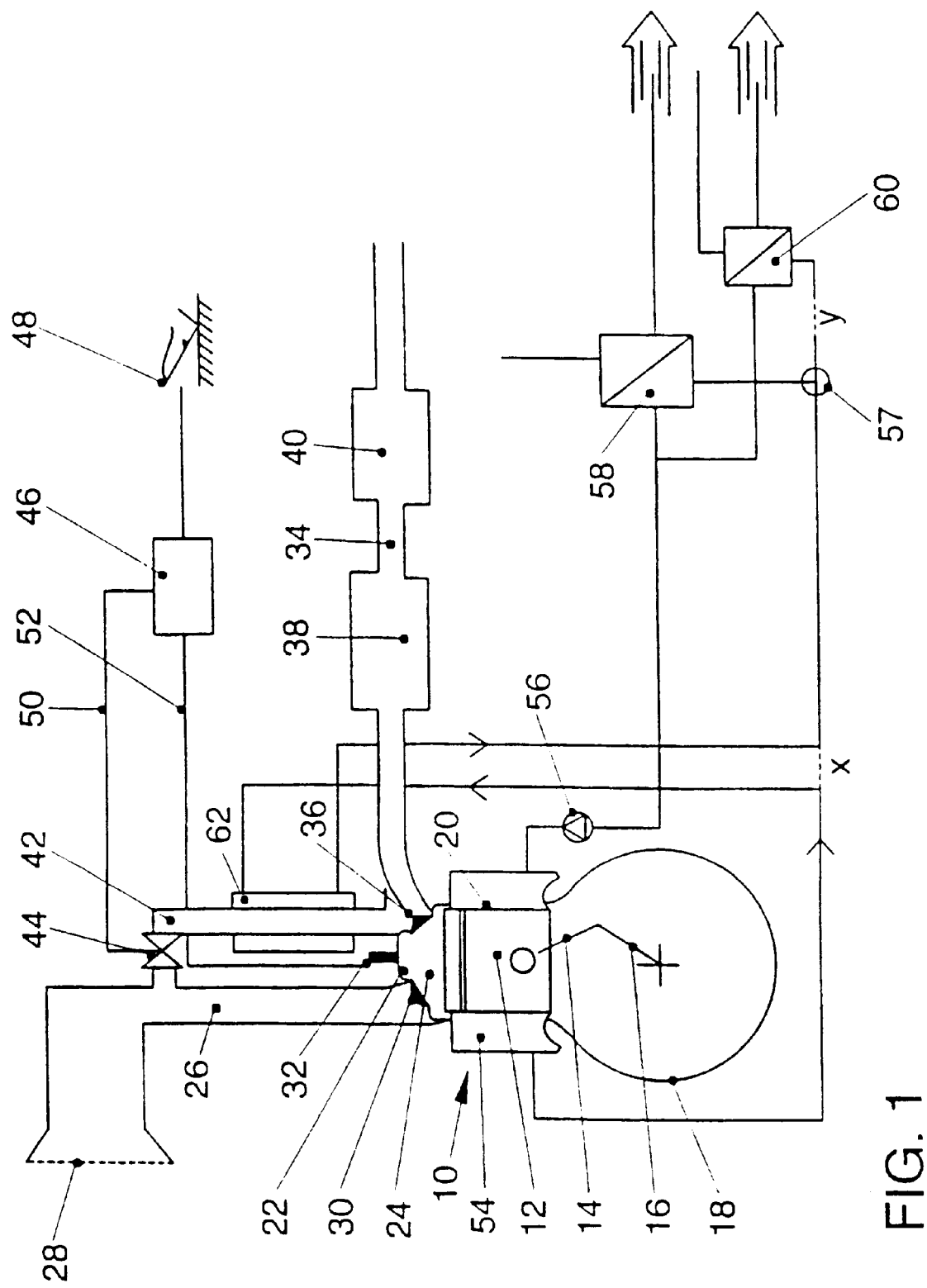
FIG. 1 is a schematic illustration showing a representative embodiment of an internal combustion engine arranged according to the invention in which a heat exchanger for the exhaust return line is connected in series with the coolant flow passing through the engine.

In the typical embodiment of the invention schematically illustrated in FIG. 1, an internal combustion engine 10 has a piston 12 connected in the usual manner by a piston rod 14 to a the crank 16 of a crankshaft rotatably supported in a crankcase 18. The piston 12 reciprocates in a cylinder 20 which is covered by a cylinder head 22 and a combustion chamber 24 is supplied with combustion air through an intake duct 26 and an air filter 28 when the piston 12 moves downwardly on the intake stroke. An inlet valve 30 actuated by a valve control mechanism, not shown, closes and opens the intake duct 26 in a conventional manner.

For internal combustion engines having direct fuel injection such as Diesel engines, an injection valve 32 serves to inject the fuel and hence to control the power output as well.

An exhaust line 34 receives the fuel combustion exhaust gases during the exhaust stroke in a conventional manner when the outlet valve 36 is open. The exhaust line 34 includes a conventional catalyst 38 a muffler 40 arranged in the usual manner.

An exhaust return line 42 conveys a portion of the exhaust gases, which are forced into the exhaust line 34 when the outlet valve 36 is open, into the intake duct 26 when a valve 44 in the exhaust return line 42 is opened. The valve 44 is closed in the part of the engine operating diagram near the full load condition by an engine control unit 46 acting through a corresponding signal line 50. At the same time, the control unit 46, acting through a signal line 52, increases the amount of fuel injected by the injection valve 32 to a level close to the carbon limit.

For the purpose of cooling the engine 10, the cylinder 20 is enclosed in a water jacket 54. Water or other heat transfer medium is circulated by a pump 56 through the jacket 54 and through a coolant circuit. The coolant circuit includes a thermostat valve 57 which controls the coolant flow through a main radiator 58 in which the heat in the coolant is given off to the environment through the airstream. The thermostat valve 57 shuts off the main radiator from the coolant circuit when the coolant is cold and opens the coolant circuit into the radiator when the coolant is hot.

In order to heat the passenger compartment of the vehicle, an additional heat exchanger 60 is provided, by which coolant heat may be transferred to the air supplied to the passenger compartment. This additional heat exchanger 60 is constantly connected to the coolant circuit.

According to the invention, the exhaust gas return line 42 is jacketed by a heat exchanger 62 by which the coolant delivered by the pump 52 flows countercurrent to the exhaust in the return line as shown by the arrows in the drawings indicating the direction of flow in the connecting lines.

During partial engine load operation, i.e. with the exhaust return valve 44 open, the coolant circuit is supplied by the exhaust return line heat-exchanger 62 with additional heat energy which can be conveyed into the passenger compartment by the heat exchanger 60 for the vehicle heater. At the same time, the exhaust gases passing through the exhaust return line 42 and returned to the engine by the intake duct 26 are cooled so that the peak combustion temperature is reduced and the $NO_x$ emissions are correspondingly reduced.

The series connection of the heat exchanger 62 with the coolant flow passing through the water jacket 54 as shown in FIG. 1 has the advantage that the coolant pump 56, which is mounted directly on the engine housing in conventional internal combustion engines, can be utilized without any change in its connections. Thus, in the embodiment shown in FIG. 1, the heat exchanger 62 is inserted in the coolant circuit at the point X, with the advantage that, if the vehicle heating system is not in operation, the exhaust gases continue to be cooled, since the coolant flowing through the heat exchanger 62 passes through the main radiator 58. Alternatively, provision may be made to connect the exhaust return heat exchanger 62 according to the invention at the location Y in FIG. 1, with the advantage that the additional heating power gained by way of the heat exchanger 62 is supplied directly and exclusively to the heat exchanger for the vehicle heater 60. In this case, the heating power initially available for heating the vehicle is increased, but cooling of the exhaust gases and the associated advantageous results are then not possible if the heater is not in operation, with the disadvantage that vapor bubbles may form in the exhaust gas heat exchanger 62.

The circuit arrangement shown in FIG. 1 has the advantage that conventional coolant pump arrangements may be used without any change. However, there is the disadvantage that the exhaust return heat exchanger 62 according to the invention is traversed by coolant that has already absorbed the excess heat from the engine in the water jacket 54 and is therefore at a higher temperature.

Figure 2:
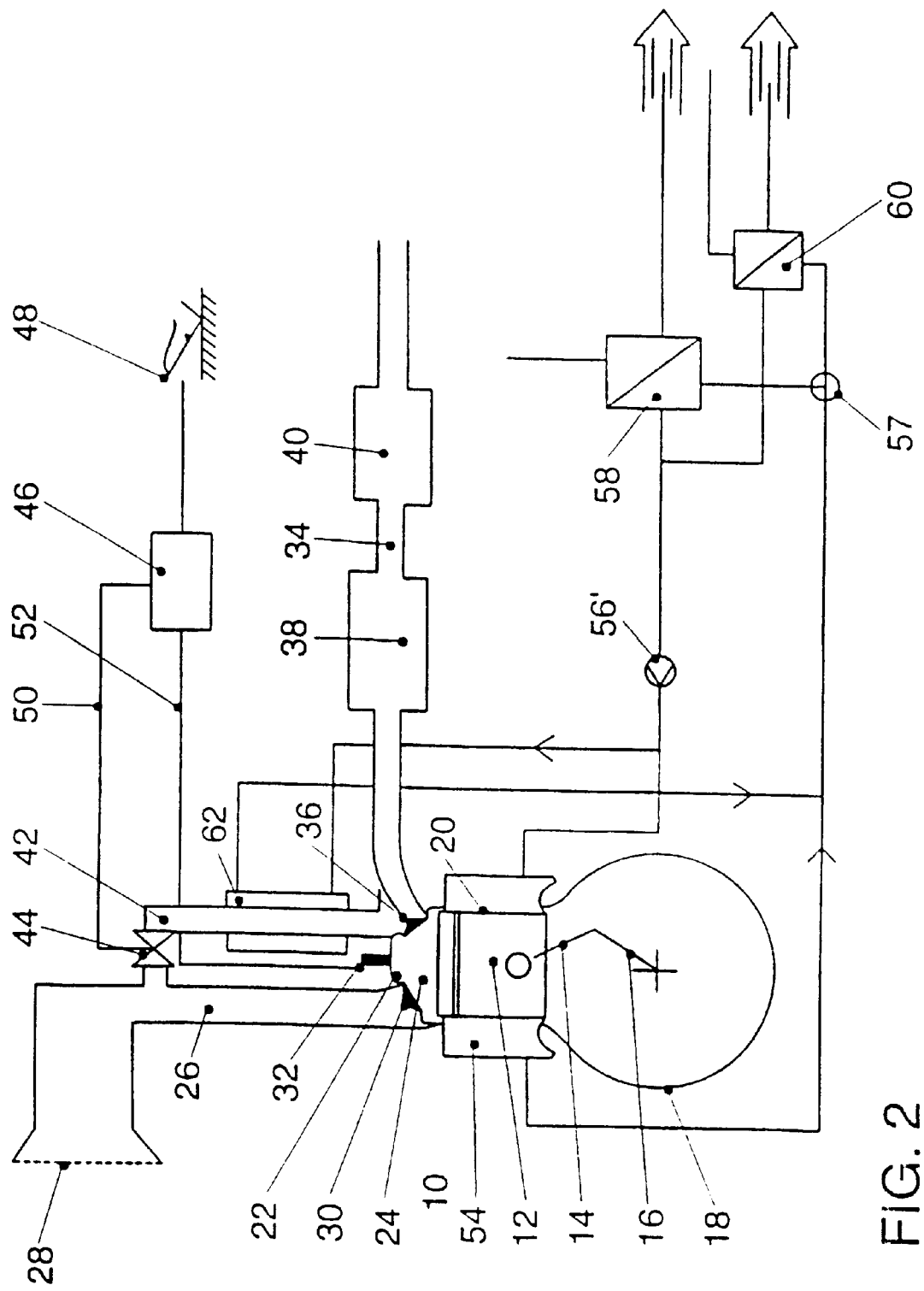
FIG. 2 is a schematic illustration showing an alternative embodiment of the invention in which the exhaust return line heat exchanger of the invention is connected in parallel with the flow of coolant passing through the engine.

In the alternative embodiment of the invention shown in FIG. 2, the exhaust return heat exchanger 62 is connected in parallel with the engine cooling water jacket 54, so that the exhaust return heat exchanger receives coolant directly from the radiator 58 and, accordingly, is colder than the coolant leaving the water jacket 54. This results in a higher temperature differential between the coolant passing through the exhaust return heat exchanger 62 and the exhaust gases therein, so that the quantity of heat supplied to the heater 60 is increased. However, this arrangement requires a different coolant pump 56'which is designed to divide the coolant flow supplied to it into one portion passing through the exhaust gas heat exchanger 62 and another portion passing through the water jacket 54 of the internal combustion engine 10.

Although the invention has been described herein with reference to specific embodiments, many modifications and variations therein will readily occur to those skilled in the art. Accordingly, all such variations and modifications are included within the intended scope of the invention.

I claim:

1. A motor vehicle comprising an internal combustion engine having an external exhaust gas return including an exhaust gas return duct connecting an exhaust duct to an intake duct and a passenger compartment;

a heater for the passenger compartment; and a heating circuit with a heat transfer medium for the passenger compartment heater including an exhaust return heat exchanger in the exhaust gas return duct which is connected in the heating circuit between the engine and the passenger compartment heater whereby heat from the exhaust gas returned through the exhaust gas return duct can be supplied to the passenger compartment heater.

2. A motor vehicle according to claim 1 wherein the exhaust return heat exchanger comprises a heat exchanger through which exhaust gases returned to the engine intake duct pass.

3. A motor vehicle according to claim 2 wherein the exhaust return heat exchanger receives heat transfer medium directly from the heating circuit.

4. A motor vehicle according to claim 2 wherein the internal combustion engine comprises an engine cooling circuit for cooling the engine, and the exhaust return heat exchanger is connected in the engine cooling circuit.

5. A motor vehicle according to claim 2 including a valve in the exhaust gas return duct and wherein the exhaust return heat exchanger is located between exhaust duct and the valve.

6. A motor vehicle according to claim 2 including a valve in the exhaust gas return duct and wherein the heat exchanger is arranged between the valve and the intake duct.

7. A motor vehicle according to claim 2 including a valve in the exhaust return duct and an engine control unit arranged to close the valve during full load operation of the internal combustion engine.

8. A motor vehicle according to claim 2 wherein the exhaust return heat exchanger is arranged to pass heat transfer medium countercurrent to the returned exhaust gases.

9. A motor vehicle according to claim 1 wherein the internal combustion engine is a Diesel engine having direct fuel injection.

10. A motor vehicle according to claim 1 wherein the heat transferred to the heat transfer medium in the exhaust return heat exchanger is substantially completely transferred to the heating circuit.

11. A motor vehicle according to claim 1 wherein the exhaust return heat exchanger receives heat transfer medium from a cooling circuit for the internal combustion engine.

* * * * *